May 10, 1955

E. BOHNET 2,707,893

HAND TOOL WITH AXIALLY MOVABLE CLUTCH MEANS FOR
CONNECTING THE HANDLE TO THE TOOL SHANK

Filed Nov. 18, 1952

INVENTOR.
Emil Bohnet
BY
Popp and Sommer
ATTORNEYS.

United States Patent Office 2,707,893
Patented May 10, 1955

2,707,893

HAND TOOL WITH AXIALLY MOVABLE CLUTCH MEANS FOR CONNECTING THE HANDLE TO THE TOOL SHANK

Emil Bohnet, Buffalo, N. Y.

Application November 18, 1952, Serial No. 321,230

2 Claims. (Cl. 81—58.3)

This invention relates to an improvement in hand tools and more particularly to an improved construction of clutch type screw driver.

An important object of the present inventiton is to provide a clutch type screw driver having a novel type of handle construction which permits the operator's hand to remain in grasping engagement with the handle at all times to effect driving in either or both directions as desired.

A further object is to provide such a screw driver which is composed of few parts and is sturdy in construction and not liable to get out of order or require repairs.

Other objects and advantages will be apparent from the following description and accompanying drawings wherein.

Figure 1:
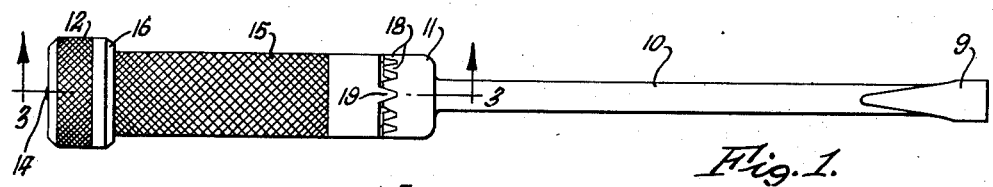
Fig. 1 is a side elevational view of a screw driver embodying my invention and showing the handle in its normal clutched position arranged for driving the blade of the screw driver in either direction.
Figure 2:
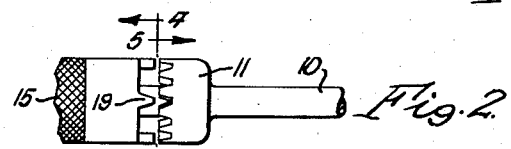
Fig. 2 is a fragmentary view of the central portion of the screw driver shown in Fig. 1 and showing a portion of the handle retracted so as to declutch the same.

In accordance with the present invention, the embodiment shown comprises an elongated shank 10 cylindrical in cross section throughout its length except for being flattened at one end to provide the usual blade 9, although this end of the shank may be provided with any other suitable type of formation or fitting such as a socket. Intermediate the ends of the shank 10, the same is shown as provided with an integral enlarged annular collar 11. Instead of this collar being formed integrally with the shank, the collar may be a separate part sweated on or otherwise non-rotatably connected to the shank. The end of the shank opposite from the blade 9 is shown as provided with a knob 12 fast thereto. While this knob may be connected to the shank 10 in any suitable manner, as shown, the end of the shank is externally threaded to screw into an internally threaded hole in the knob 12, such threaded engagement being indicated at 13. A set screw 14 arranged in a threaded hole partially formed in the body of the shank and in the body of the knob is shown as provided to prevent relative rotative movement between the shank and knob.

An elongated tubular sleeve 15 is shown as surrounding the shank 10 and arranged between the knob 12 and collar 11 and is adapted to be grasped by the full hand of the operator. The inner axially facing side of the knob 12 is shown as being provided with a counterbore which provides a forwardly projecting annular extension 16 which surrounds at all times the adjacent rear end of the sleeve 15. A close clearance exists between the opposing peripheral faces of the sleeve 15 and extension 16 on the knob so that the rear end of the sleeve can be guided by this extension. The sleeve 15 adjacent its forward end is shown as provided with an inwardly projecting annular flange 17 which circumscribes a hole through which the shank 10 extends. The sleeve 15 is therefore arranged for sliding and rotation relative to the shank 10.

The opposing faces of the sleeve 15 and collar 11 are provided with teeth. Thus the rear face of the collar 11 is provided with an annular series of teeth 18 which have equally tapering sides leaving tapering recesses between adjacent pairs of teeth adapted severally to receive a series of teeth 19 provided on the front end face of the sleeve 15. While only four such teeth 19 are shown in the drawings it is to be understood that any number of similar teeth may be provided as will cooperate with the teeth 18 on the collar 11.

Figure 3:
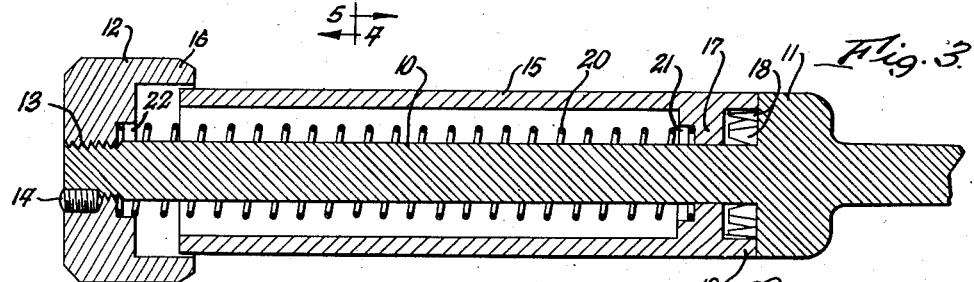
Fig. 3 is a fragmentary enlarged central longitudinal section through the handle portion of the screw driver, this view being taken on line 3—3 of Fig. 1.
Figure 4:
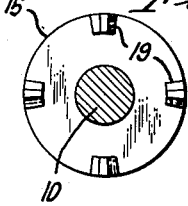
Figs. 4 and 5 are enlarged transverse sectional views thereof taken on the correspondingly numbered lines of Fig. 2.
Figure 5:
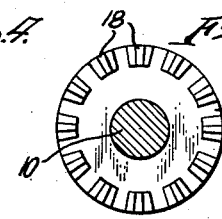

The sleeve 15 is constantly urged forwardly on the shank 10 on toward the collar 11 so as to engage the two sets of teeth 18 and 19 as shown in Figs. 1 and 3. For this purpose, spring means are interposed between the knob 12 and the sleeve 15. As shown, such means comprise a helical compression spring 20 arranged within the sleeve 15 and surrounding the shank 10 and having its forward end bearing against an axially facing shoulder formed by a counterbore 21 provided in the annular flange 17 on the sleeve, and at its rear end against the opposing axially facing shoulder provided by the counterbore 22 provided in the knob 12. The counterbores 21 and 22 serve to center the spring 20 relative to the shank 10 and it will be seen that the principal portion of the length of the sleeve 15 is of such diameter as to accommodate the spring.

Referring to Fig. 3, it will also be noted that sufficient clearance or axial spacing exists between the rear end face of the sleeve 15 and the opposing face on the knob 12, this spacing permitting the sleeve 15 to be moved rearwardly relative to the shank 10 so as to retract the teeth 19 from engagement with the teeth 18 on the collar 11.

Figure 6:
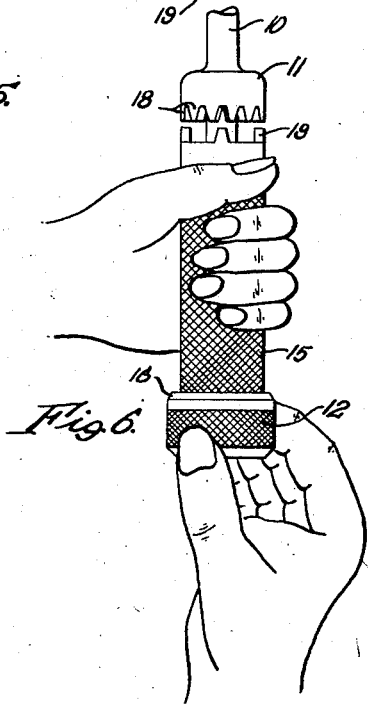
Figs. 6 and 7 illustrate different ways in which the screw driver can be held for use.

Referring to Fig. 6, which illustrates one mode of use of the screw driver, the operator may grasp the sleeve 15 in his left hand and the knob 12 in his right hand or fingers. Then, by axially shifting the sleeve 15 toward the knob 12 the teeth 18 and 19 can be disengaged, permitting the shank 10 to be turned in either direction by turning the knob in the corresponding direction with the fingers of the right hand. Such a mode of use may be employed when starting to drive a screw which offers little resistance to turning.

Figure 7:
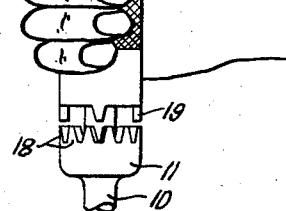

However, when there is considerable resistance to turning of the shank of the screw driver, the same can be held in the position shown in Fig. 7. In such position, the palm or heel of the left hand of the operator is shown as pressing against the outer end of the knob 12 and the operator's right hand grasps the sleeve 15. With continued pressing of the left hand against the knob, it will be seen that the right hand grasping the sleeve 15 can be rotated in either direction as desired with or without the teeth 19 on the sleeve engaging the teeth 18 on the collar 11. For example for part of the turning movement of the sleeve 15 the operator will allow the spring 20 to maintain engagement of two sets of teeth but when the comfortable limit of turning is reached the operator merely slides the sleeve 15 away from the collar 11 and toward the knob 12 so as to disengage the two sets of teeth thereby permitting the sleeve to be freed and turned relative to the shank in the opposite direction preparatory to again releasing the sleeve so as to re-engage the two sets of teeth for a further driving movement.

The external peripheries of the knob 12 and sleeve 15 are preferably knurled so that the surfaces may be firmly grasped by the operator to prevent slippage. In use, it will therefore be seen that the screw driver can be operated without ever requiring the operator to release his grasp on the sleeve 15 which can be clutched or declutched as desired by a slight axial displacement of the same.

A hand tool embodying the present invention is exceedingly simple and inexpensive to manufacture and it is to be understood that the embodiment shown is but one illustration of the invention which is to be limited only by the scope of the claims.

I claim:

1. A hand hool, comprising a shank, a collar fast to said shank and arranged intermediate the ends thereof, a knob fast to one end of said shank, an elongated sleeve surrounding said shank and arranged between said collar and knob and movable toward and away from said collar and adapted to be grasped by the full hand of the operator, cooperating teeth on the opposing faces of said sleeve and collar, and spring means interposed between said sleeve and knob and arranged to urge the teeth on said sleeve into engagement with the teeth on said collar, said sleeve being manually movable away from said collar against the urging of said spring means to separate said teeth.

2. A hand tool, comprising a shank, a collar fast to said shank and arranged intermediate the ends thereof, an annular series of axially projecting teeth on one side of said collar, an elongated sleeve rotatably and slidably arranged on said shank and having a face opposing said one side of said collar and adapted to be grasped by the full hand of the operator, said face having a plurality of axially projecting teeth adapted to interlock with the teeth on said collar, a knob fast to one end of said shank and having an annular extension which surrounds the adjacent end of said sleeve at all times, and a helical compression spring surrounding said shank and interposed between said sleeve and knob and constantly urging said sleeve to move toward said collar so as to engage both sets of teeth, said sleeve being manually movable away from said collar against the urging of said spring so as to retract the teeth on said sleeve from engagement with the teeth on said collar.

References Cited in the file of this patent

UNITED STATES PATENTS

| | | |
|---|---|---|
| 339,875 | Geary | Apr. 13, 1886 |
| 1,521,331 | Sedgley | Dec. 30, 1924 |
| 1,627,441 | Lawyer | May 3, 1927 |
| 1,643,860 | Shedd | Sept. 27, 1927 |
| 2,641,291 | Yess | June 9, 1953 |